(12) United States Patent
Grovatt et al.

(10) Patent No.: US 10,371,105 B1
(45) Date of Patent: Aug. 6, 2019

(54) FUEL TREATMENT MODULE, SYSTEM AND METHOD

(71) Applicant: Cameron Dynamics, LLC, Allentown, PA (US)

(72) Inventors: William Richard Grovatt, Macungie, PA (US); Richard Michael Vihonski, Georgetown, DE (US); Thomas D. Mesko, Allentown, PA (US)

(73) Assignee: Cameron Dynamics, LLC, Allentown, PA (US)

( * ) Notice: Subject to any disclaimer, the term of this patent is extended or adjusted under 35 U.S.C. 154(b) by 0 days.

(21) Appl. No.: 15/823,410

(22) Filed: Nov. 27, 2017

Related U.S. Application Data

(60) Provisional application No. 62/427,713, filed on Nov. 29, 2016.

(51) Int. Cl.
*F02M 27/06* (2006.01)
*F02M 33/08* (2006.01)
*C10L 1/04* (2006.01)
*B01J 8/22* (2006.01)

(52) U.S. Cl.
CPC .............. *F02M 27/06* (2013.01); *B01J 8/226* (2013.01); *C10L 1/04* (2013.01); *F02M 33/08* (2013.01); *B01D 2273/22* (2013.01)

(58) Field of Classification Search
CPC ......... F02M 27/06; F02M 33/08; B01J 8/226; B01J 8/22; B01D 2273/22; C01L 1/04
USPC ................................ 250/504 R, 316.1, 493.1
See application file for complete search history.

(56) References Cited

U.S. PATENT DOCUMENTS

| | | | |
|---|---|---|---|
| 4,267,976 A | 5/1981 | Chatwin | |
| 4,789,212 A | 12/1988 | Bristow et al. | |
| 6,026,788 A | 2/2000 | Wey | |
| 6,082,339 A | 7/2000 | Wey | |
| 6,293,963 B1 | 9/2001 | Wey | |
| 6,363,285 B1 | 3/2002 | Wey | |
| 6,817,347 B2 | 11/2004 | Noble | |
| 7,056,179 B2 * | 6/2006 | Courtney | B63C 9/0005 441/90 |
| 7,281,526 B2 | 10/2007 | Keiichiro et al. | |
| 7,617,815 B2 | 11/2009 | Wey | |
| 2002/0139934 A1 * | 10/2002 | Chang | G01N 21/3504 250/343 |
| 2006/0011176 A1 | 1/2006 | Wey | |
| 2009/0193797 A1 | 8/2009 | Wey | |
| 2010/0202941 A1 | 8/2010 | Chikada | |
| 2011/0186010 A1 | 8/2011 | Wey | |
| 2011/0265779 A1 * | 11/2011 | Vandrak | F24H 3/0488 126/93 |
| 2012/0037098 A1 | 2/2012 | Wey | |

(Continued)

*Primary Examiner* — Nicole M Ippolito
(74) *Attorney, Agent, or Firm* — Connie R. Masters

(57) ABSTRACT

A fuel treatment module treats fuel with infrared radiation from a plurality of infrared radiation emitting elements arranged in a structure configured to ensure sufficient exposure of the fuel to infrared radiation. Such structure includes a head cap and spacer having through bores providing a manifold through which fuel flows into multiple IR/shunt columns of infrared radiation emitting elements that are disposed within a canister. Then the fuel moves out of the multiple IR/shunt columns into the open area of the canister where the fuel then flows around the exterior of the columns, exposing the fuel to further infrared radiation treatment.

18 Claims, 12 Drawing Sheets

(56) References Cited

U.S. PATENT DOCUMENTS

2012/0061232 A1     3/2012   Wey
2012/0247000 A1*   10/2012   Wey ......................... C10L 1/32
                                                                                 44/301

* cited by examiner

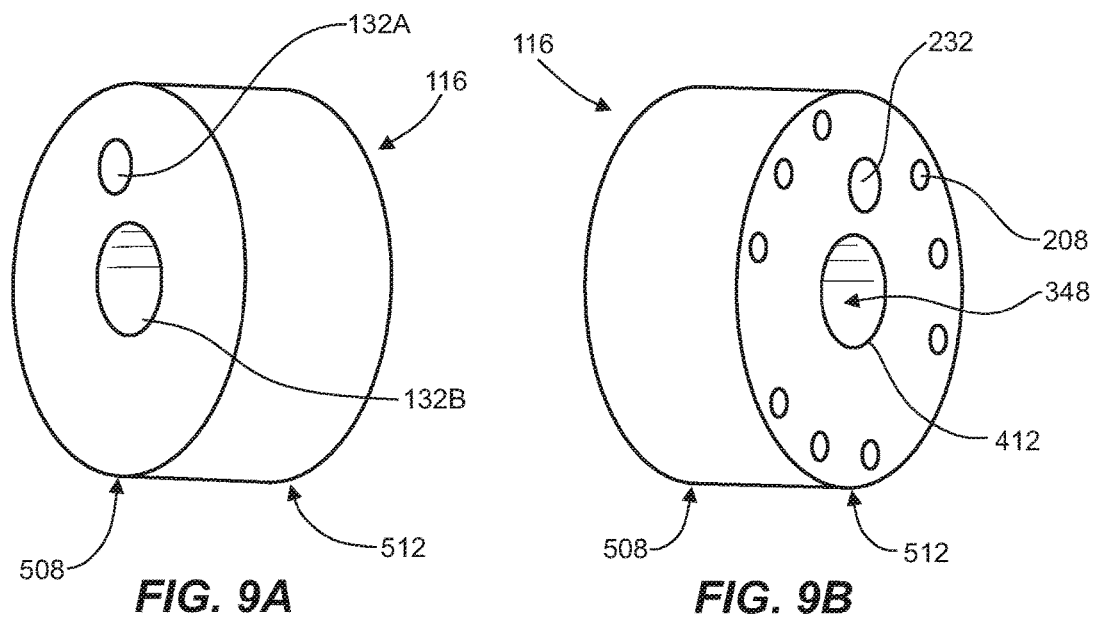
FIG. 9A  FIG. 9B
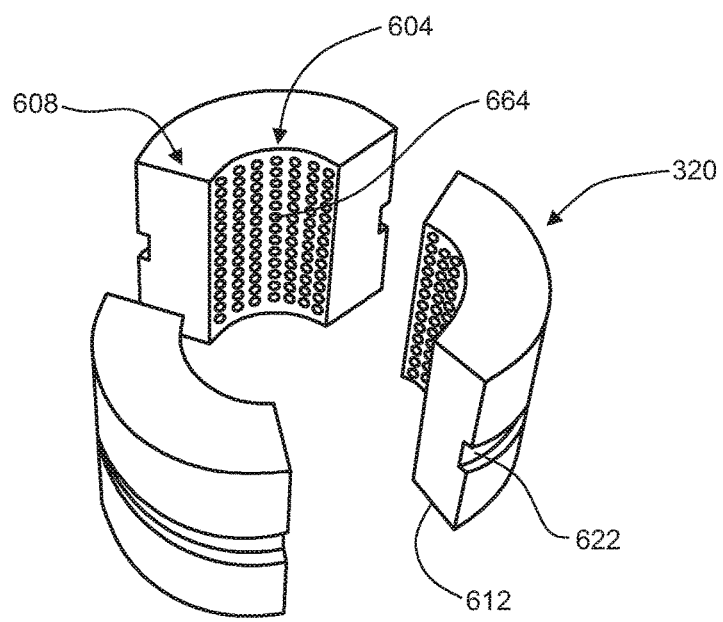
FIG. 10A

FUEL TREATMENT MODULE, SYSTEM AND METHOD

CROSS-REFERENCE TO RELATED APPLICATIONS

This nonprovisional application claims the benefit of U.S. Provisional Patent Application Ser. No. 62/427,713, filed on Nov. 29, 2016, which is incorporated herein in its entirety.

FIELD OF THE INVENTION

The invention relates to hydrocarbon fuel treatment systems and methods and, more particularly, to a hydrocarbon fuel treatment module for maximizing exposure of fuel to active infrared treatment elements.

BACKGROUND OF THE INVENTION

A variety of systems and methods have been developed to treat fuel to improve characteristics thereof. U.S. Pat. No. 7,281,526 by Keiichiro discloses a fuel-improving device that applies far-infrared radiation to fuel by placing granular far-infrared emitting substances directly in the flow path of fuel to improve output power and fuel economy of an internal combustion engine. The inlet and outlet of the device have a porous structure having pores sized to prevent the far-infrared emitting granules from exiting the device while allowing fuel to pass through the device.

U.S. Patent Publication No. 2010/0202941 by Chikada and U.S. Pat. No. 6,082,339 by Wey disclose fuel reforming devices that similarly place one or more photon-emitting ceramic granules directly in the flow of fuel. A mesh structure or one or more fixation pins are used to retain the pieces of ceramic granules in the device while allowing the fuel to pass through the device.

U.S. Pat. No. 6,026,788 by Wey discloses a fuel-activating device where the fuel does not come into direct contact with a far infrared emitting substance. The device comprises a case that is mounted externally on a fuel line of an internal combustion engine with the fuel flowing through the device at the fuel flow rate of the system. The case is hinged to allow it to close around the fuel line and is subsequently secured around the fuel line by a locking mechanism. However, the fuel flows through the fuel line too quickly for effective treatment by the far infrared emissions, so cannot achieve photon saturation.

Though various systems have been designed to treat fuel with far-infrared radiation, these conventional systems do not achieve photon saturation, but are limited in the amount of far infrared treatment that can be applied to the volume of fuel in the time available for treatment. A system and method are needed that provides a means to increase the treatment of the fuel to achieve photon saturation by slowing the fuel flow rate and thus increasing exposure to the far infrared emitting substance. From the discussion that follows, it will become apparent that the present invention addresses the deficiencies associated with the prior art while providing numerous additional advantages and benefits not contemplated or possible with prior art constructions.

SUMMARY OF THE INVENTION

A fuel treatment module, system and method for treating fuel to improve fuel efficiency and lower emissions are disclosed herein. As will be detailed further below, the infrared (IR) emitting fuel treatment module may have a variety of configurations and is capable of operating in various environments of use, including mobile and fixed environments. In addition, the fuel treatment module may be used to treat various types of hydrocarbon fuel, and may be easily connected to additional fuel treatment modules to increase fuel treatment capacity. Compared to conventional fuel treatment devices, the fuel treatment module provides the structure and method for treating a larger amount of fuel in a shorter time frame or treating fuel in systems that have a higher flow rate by reducing the incoming fuel's flow rate and routing the fuel both inside and outside the far infrared emitting substance.

In one exemplary embodiment, such a fuel treatment module may include a head portion attached to a canister. The head portion comprises a fuel inlet to receive fuel, a fuel distribution manifold to distribute the received fuel to shunt tubes within the canister, a fuel outlet, and a head cap to seal the end of the canister. The fuel treatment module preferably includes a spacer comprising a plurality of through bores and a portion of the distribution chamber formed between the head cap and spacer. The canister includes a body preferably configured with an upper flange for attachment to the head portion (or to the spacer portion in embodiments having a spacer), body walls, and an end cap to seal the body.

Within the canister is an internal fuel treatment assembly having a plurality of IR/shunt columns, each of which includes an inner shunt tube surrounded by a plurality of infrared radiation emitting elements. The canister encloses the plurality of IR/shunt columns and contains fuel flowing out of each IR-overlaid channel at the center of each column shunt tube such that the fuel fills the canister and flows out of the canister into the head portion through an opening in the spacer in the preferred embodiment. Each IR/shunt column's shunt tube is attached to the spacer at one of the plurality of through bores. A conduit within the head cap is connected to the opening in the spacer and to the fuel outlet of the head cap; fuel flowing out of the canister flows through the outlet opening in the spacer and through the head duct to exit the fuel treatment module at the fuel outlet.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 9A is a perspective view of the top of a second exemplary head cap.

FIG. 9B is a perspective view of the bottom of the second exemplary head cap of FIG. 9A.

FIGS. 10A-10F are perspective views illustrating a variety of exemplary infrared radiation emitting elements.

DETAILED DESCRIPTION OF THE PREFERRED EMBODIMENTS

The fuel treatment module 104 herein benefits from the property of liquid substances, such as liquid hydrocarbon fuel, that when an infrared emitting element 320 (FIGS. 3, 4, 5, 10A-10F) is brought close to such liquid substances, the infrared radiation (in the form of photons) emitted from the infrared emitting element 320 is absorbed by molecules in the liquid, transferring energy to the molecules and exciting them. (Hydrocarbon molecules in fuel are capable of utilizing the infrared radiation between 3 and 20 µm (micron) wavelengths to cause such excitation of the fuel.) The fuel treatment module 104 herein employs a plurality of infrared emitting elements 320, which in a preferred embodiment are infrared emitting ceramic elements, designed to emit infrared radiation at 3 to 20 µm wavelengths that are disposed within a canister 124. The canister 124 and its internal components both facilitate and maximize direct and indirect exposure of fuel to the infrared emitting elements and reduce the rate of fuel flow within the canister 124 compared to the normal fuel flow rate of the fuel system.

Figure 1A:
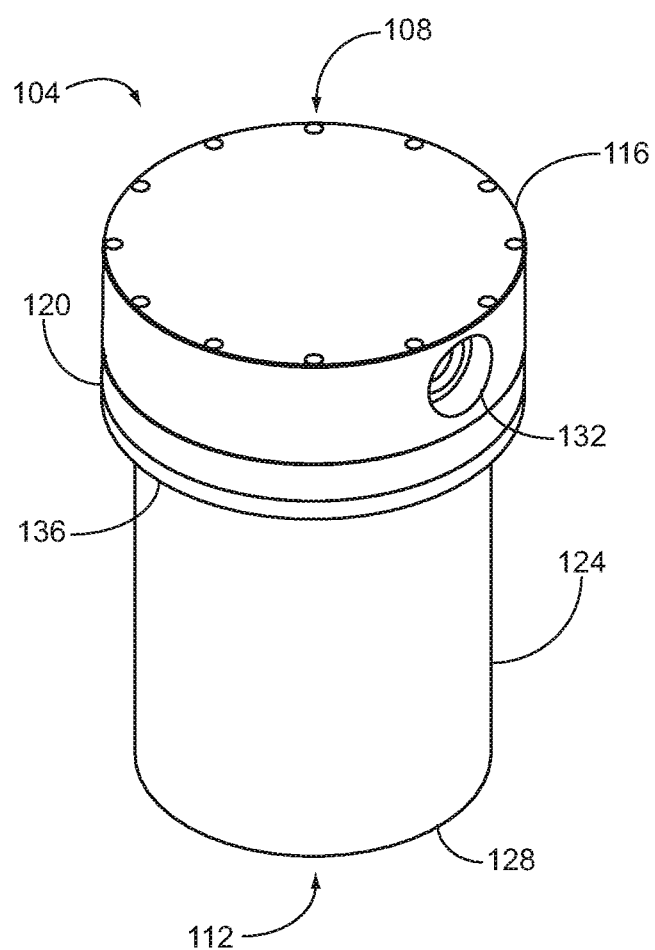
FIG. 1A is a perspective view illustrating an exemplary fuel treatment module.
Figure 1B:
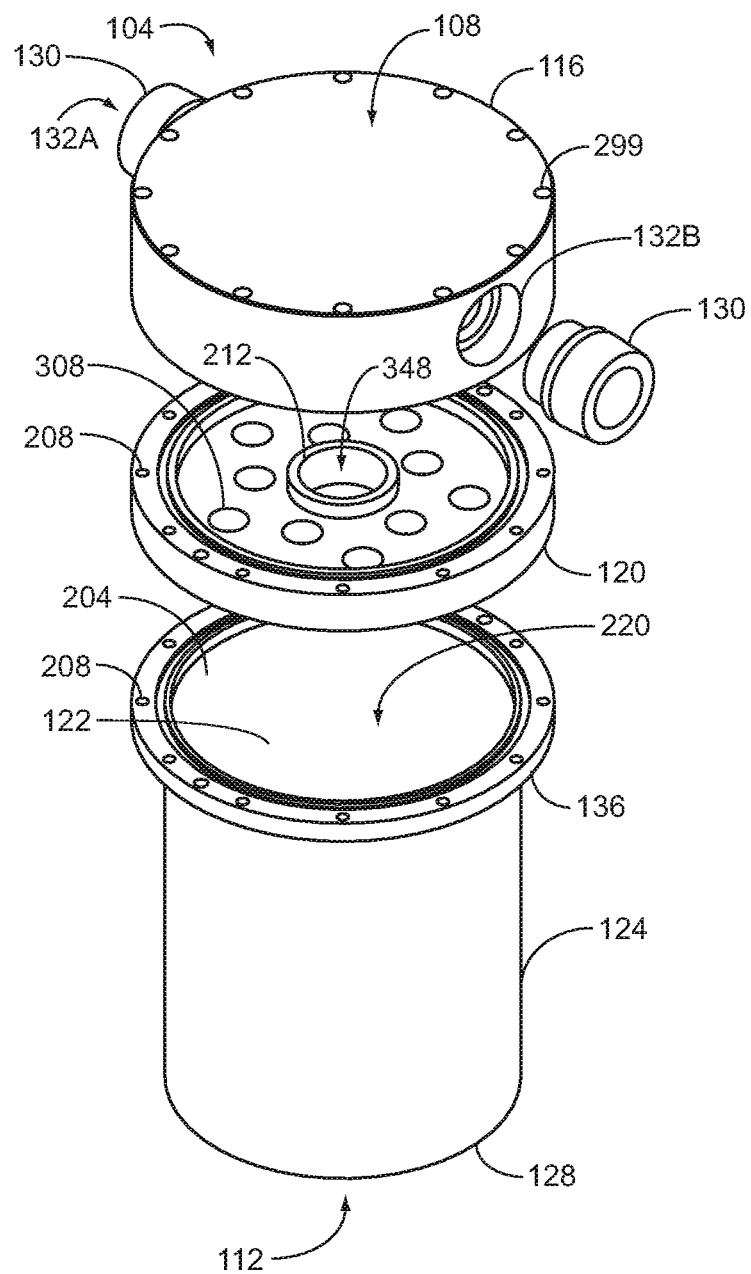
FIG. 1B is an exploded perspective view illustrating an exemplary fuel treatment module.
Figures 3, 4:
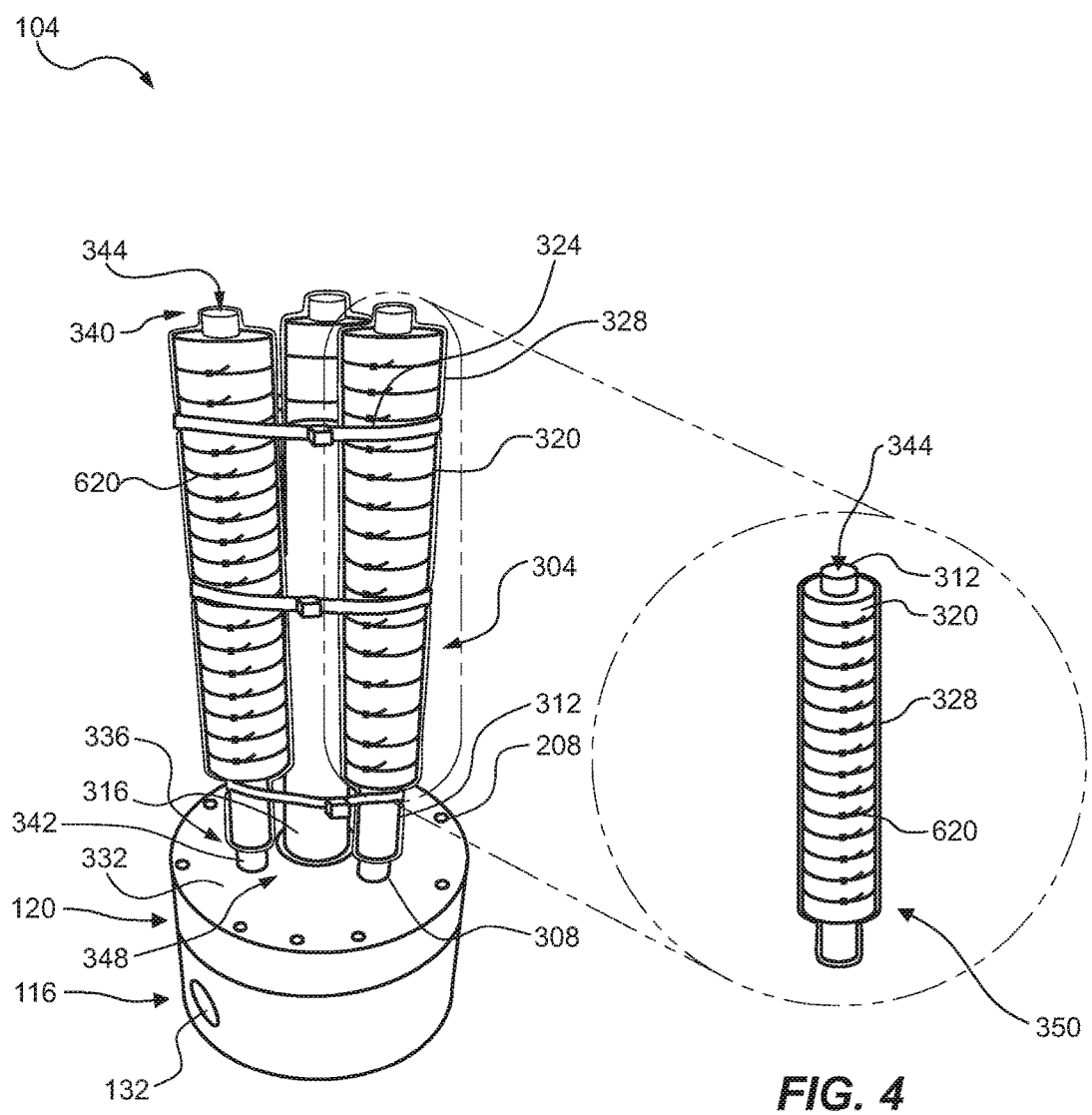
FIG. 3 is a perspective view illustrating a first exemplary internal fuel treatment module and head having three IR/shunt column assemblies, which is shown with the canister removed and is shown inverted compared to the previous illustrations.
FIG. 4 is a detail view of one IR/shunt columns of the internal fuel treatment module.

An exemplary fuel treatment module 104 is shown in the perspective view of FIGS. 1A and 1n the exploded perspective view of FIG. 1B, but is shown in both figures with the internal fuel treatment assembly 304 of FIG. 3 removed for clarity of discussion. Though illustrated as having a cylindrical shape, it is noted that the fuel treatment module may be rectangular, square or various other shapes. (For instance, a round shape may be less expensive to manufacture, but another shape may better utilize available space in some applications with tight space restrictions.) As can be seen, the fuel treatment module 104 may be configured as a self-contained unit for installation in various environments of use, including mobile (such as vehicular) or non-mobile, fixed installations. In addition, the modular nature of the fuel treatment module 104 allows it to be combined or interconnected with additional fuel treatment module(s) 104 to treat fuel at various flow rates and in numerous applications.

The fuel treatment module 104 will typically comprise a canister 124, a spacer 120, a head cap 116, and an internal fuel treatment assembly 304. These parts of the fuel treatment module 104 form a compartment for housing the internal components while allowing fuel to enter and exit. In the embodiment of FIGS. 1A-1B for instance, the fuel treatment module 104 comprises a canister 124 enclosed at its top 108 and bottom 112 by a head cap 116 and end cap 128, respectively. The fuel capacity of the canister 124 is equal to a minimum of 30 seconds of fuel flow.

The head cap 116 will typically comprise at least two openings 132 in the form of a fuel inlet 132 (which may be A (FIGS. 6, 8B, 9A) and fuel outlet 132B (FIGS. 6, 8A, 9A) to allow fuel to pass into and out of the fuel treatment module 104. The manifold assembly 404 (FIG. 6) of the head cap 116 and the spacer 120 assists in fuel distribution and the securing of internal components of the fuel treatment module 104, as will be described further below. One or more gaskets, seals or the like, such as O-rings 606, 607 (FIG. 6), may be positioned between elements of the fuel treatment module 104 to ensure that fuel does not escape from the fuel treatment module 104 or leak between internal components.

Figure 2A:
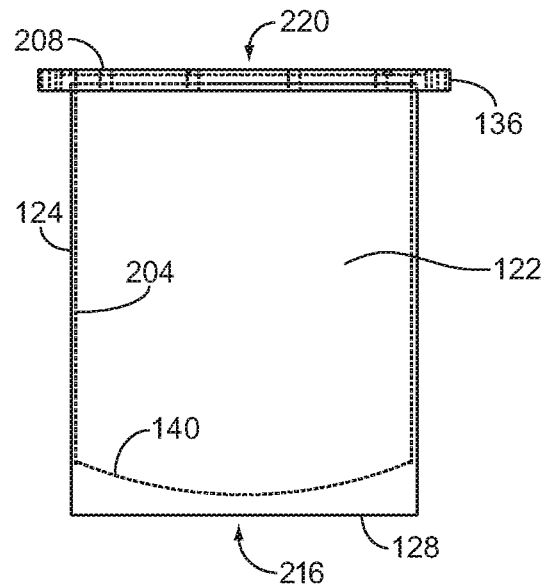
FIG. 2A is a side cross-sectional view illustrating an exemplary canister.
Figure 2B:
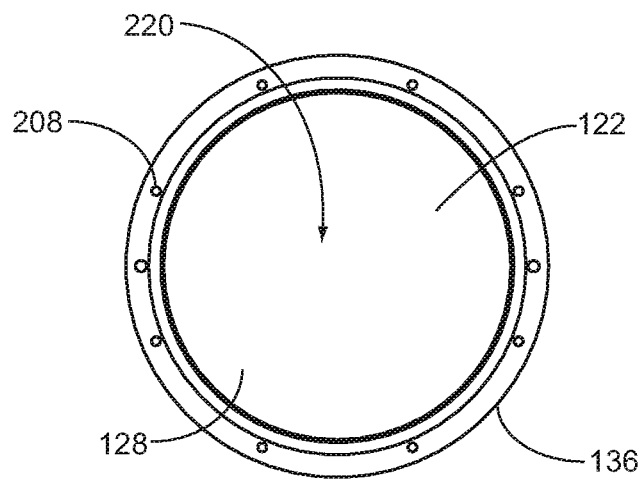
FIG. 2B is a top view illustrating an exemplary canister.

FIG. 2A illustrates a side cross-sectional view of the canister 124 of an exemplary fuel treatment module 104. As can be seen, the canister 124 will typically comprise a body 204 enclosed at a bottom end 216 (FIG. 2) by an end cap 128. The top end 220 will typically be open to allow fuel to flow into the body 204 of the canister 124 for treatment. At its top end 220, the canister 124 may comprise a flange 136 to aid in the attachment of one or more spacers or in the attachment of a head cap. As can be seen, the flange 136 provides an enlarged mating surface as well as multiple flange boreholes 208 configured to accept fasteners for attaching and securing these elements to the canister 124. One advantage of flange boreholes 208 (or other mounting structures, which may be fixed or removable) is that they permit various elements of the fuel treatment module 104 to be removed, such as to permit maintenance, modification or repair of portions of the fuel treatment module 104. For example, the flange boreholes 208 may be configured to receive threaded fasteners that may be removed to detach a spacer 120 or head cap 116 of the fuel treatment module 104. This allows access to the interior of the fuel treatment module 104. The flange boreholes 208 may be threaded and/or through holes. FIG. 2B illustrates a top view of the canister 124 showing an exemplary arrangement of flange boreholes 208.

It will be understood that a flange 136 and/or flange boreholes 208 may not be provided in all embodiments of the fuel treatment module 104. For instance, the flange 136 is not required where the canister 124 and head cap are integrally formed. Or the flange boreholes 208 (or other mounts or attachment structures) may be formed in the canister's body 204, rather than in a flange 136.

At the canister's bottom end 216, the end cap 128 may be planar or shaped at its proximal surface in one or more embodiments. For example, the end cap 128 of FIG. 2A has a concave proximal surface 140. The proximal surface may be varied as needed for particular sizes and interior configurations of the canister 124 and as needed to beneficially alter fuel flow within the canister 124. The end cap 128 may be integrally formed with the canister 124 or may be separately formed and attached to the canister 124, such as by welding, bonding or bolting the end cap to the canister 124. In the latter case, the end cap 128 can be removed, such as to permit maintenance, modification or repair.

Preferably, most or all of the canister 124, spacer 120, and head cap 116 are formed of metallic materials. The canister 124 is preferably formed of anodized aluminum or steel.

An exemplary internal fuel treatment assembly 304 (FIG. 3) of the fuel treatment module 104 will now be described with regard to the perspective view of FIG. 3. In FIG. 3, the canister 124 is removed to provide a view of the interior of the fuel treatment module 104. Also, the internal fuel treatment assembly 304 is illustrated as inverted compared to its normal operational orientation shown in FIGS. 1A-1B. Preferably, the fuel treatment module 104 is in the illustrated inverted orientation during assembly of the internal fuel treatment assembly 304.

Figure 5:
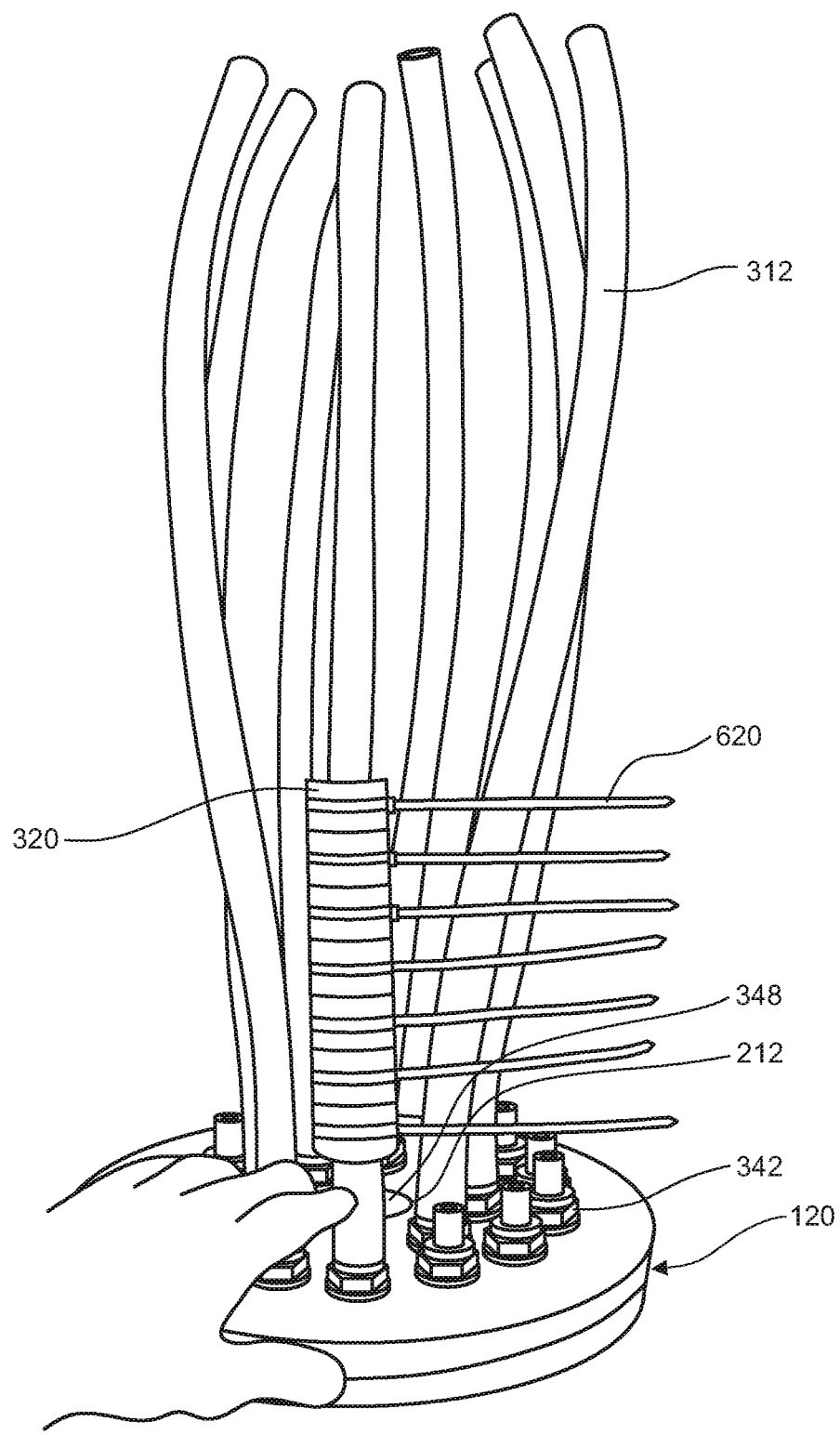
FIG. 5 is a perspective view illustrating the spacer and shunt tubes of a second exemplary internal fuel treatment assembly shown during the assembly of part of the IR/shunt columns.
Figure 7:
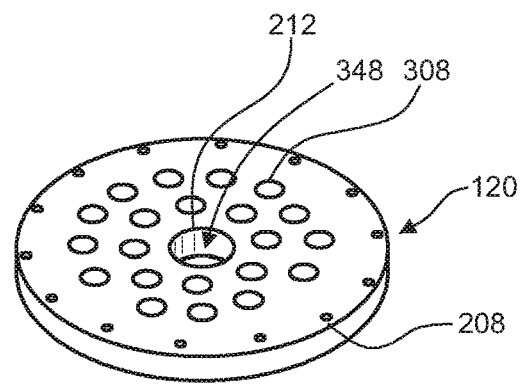
FIG. 7 is a perspective view of an exemplary spacer.

In general, the internal fuel treatment assembly 304 is configured to maximize application of infrared radiation to fuel from a plurality of infrared radiation emitting elements 320. As can be seen, an internal fuel treatment assembly 304 may attach to a head cap 116 and preferably a spacer 120. The spacer 120 may have an arrangement of one or more through bores 308 with shunt tubes 312 attached to and extending outward from an interior side 332 of the spacer. Typically, a plurality of through bores 308 and shunt tubes 312 will be provided, such as the three through bores 308 (and three shunt tubes 312) shown in FIG. 3. It is contemplated that the through bores 308 may be provided and arranged in one or more concentric circles or other shapes. For example, FIG. 7 shows an exemplary spacer with multiple irregular circles of through bores 308 to receive shunt tubes 312, and FIG. 5 shows an inner and outer circle of hose barbs 342 (attached to through bores 308, which are not seen). Preferably, from three to thirty through bores 308 with associated shunt tubes 312 are used in a single internal fuel treatment assembly 304 of a fuel treatment module 104.

In one or more embodiments, one or more shunt attachment devices, fasteners, or nipples, which are herein referred to as "hose barbs 342" may be received within or at each through bore 308 to secure each shunt tube 312 to a through bore 308. One or more hose clamps or other fasteners may also be used to secure a shunt tube 312 if desired.

The shunt tubes 312 may be formed from rubber, plastic or other non-metallic material that is substantially transparent to infrared radiation. This permits one or more infrared radiation emitting elements 320 to treat fuel flowing within the shunt tubes 312. Preferably, the shunt tubes 312 are coated both inside and outside with a hydrocarbon-resistant material. Typically, a plurality (and preferably a large number) of infrared radiation emitting elements 320 are installed around the exterior of each of the shunt tubes 312 to maximize fuel exposure to infrared radiation. As shown in FIGS. 3-4 for instance, each shunt tube 312 has multiple infrared radiation emitting elements 320 along its length with minimal or no spacing between each infrared radiation emitting element 320.

As can be seen, each shunt tube 312 and its corresponding infrared (IR) radiation emitting elements 320 form an IR/shunt column 350 having an IR-overlaid channel 344 for fuel in the interior of the shunt tube 312. A tubular wrapping 328 may be formed or installed around each IR/shunt column 350 to ensure that the infrared radiation emitting elements 320 are secured to their corresponding shunt tube 312. The wrapping 328 will typically extend a length sufficient to wrap all of a particular column's infrared radiation emitting elements 320. The wrapping 328 will typically be formed from rubber, plastic or other non-metallic material that is substantially transparent to infrared radiation. For example, the wrapping may be a transparent shrink wrap in some embodiments, in which case heat is used to shrink and tighten the wrapping 328.

In operation, fuel flows both through and around the outside of the IR/shunt columns 350 to maximize the fuel's exposure to infrared radiation. More specifically, fuel enters a proximal end 336 of each column's shunt tube 312, flows through the IR-overlaid channel 344 in the interior of the shunt tube 312, and exits at a distal end 340 of the shunt tube. At the open distal end 340 of each shunt tube 312, the fuel enters the open area 122 (FIGS. 1B, 2A) within the compartment formed by the canister 124, typically entering at the bottom 112 of the canister. The fuel can then fill the canister 124, namely the open compartment 122 formed within the canister 124; this causes the fuel to then surround the exterior of the infrared radiation emitting elements 320 that form the outside of the IR/shunt column 350. This further exposes the fuel to infrared radiation. An opening 348 defined by spacer opening perimeter 212 and by head opening perimeter 412 (shown as a centrally located opening in FIGS. 1B, 6, 8B, 9B) in the spacer 120 and head cap 116, respectively, will typically be provided to allow the fuel to exit the canister 124 and fuel treatment module 104 at fuel outlet 132B. The fuel outlet 132B is at least equal in diameter to the diameter of the fuel flow opening 348. A spacer 120 illustrating an exemplary opening 348 defined by opening perimeter 212 is shown in FIGS. 1B, 5, 6, and 7.

In an aspect, an optional spine 316 (FIG. 3) may be provided to support the shunt tubes 312, if desired. One or more column bindings 324 (FIG. 3) may be used to tie or otherwise secure each IR/shunt column 350 to the spine 316. This ensures that the IR/shunt columns 350 remain in position during use. The spine 316 may be centrally located. Alternatively, the spine 316 may extend from other locations of the interior surface 332 of the spacer 120 (or from the interior surface of the head cap 116 in embodiments in which there is no spacer). In another aspect, the spine 316 may include one or more loops, hooks or hoses that may be spaced intermittently and to which one, multiple, or all of the IR/shunt columns 350 may be attached for stabilization. It is noted that in aspects lacking a spine 316, the shunt tubes 312 may optionally be bound or otherwise attached to one another to support each other, such as by the use of the column bindings 324 of FIG. 3.

Figure 6:
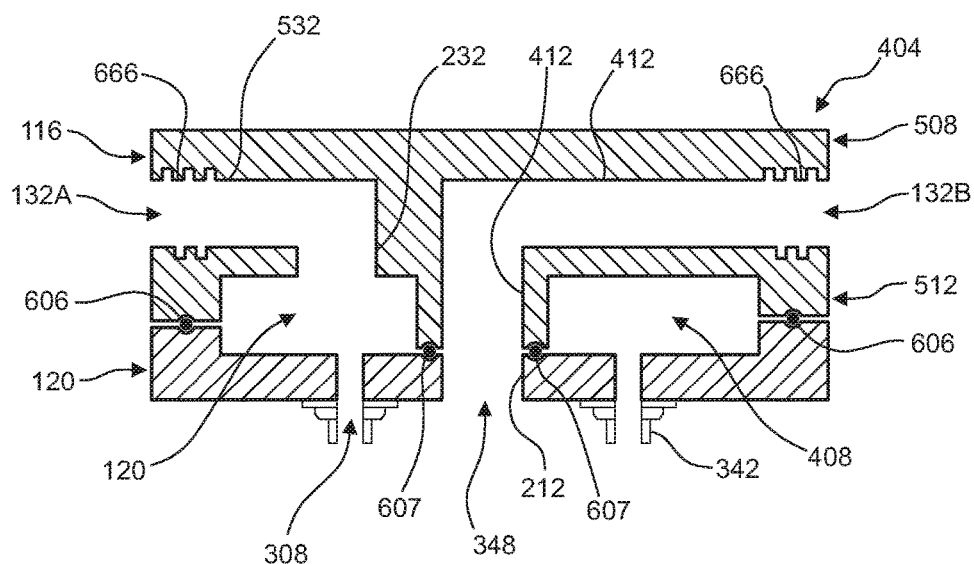
FIG. 6 is a side cross-sectional view of the head cap, spacer and an exemplary fuel manifold assembly.
Figure 11:
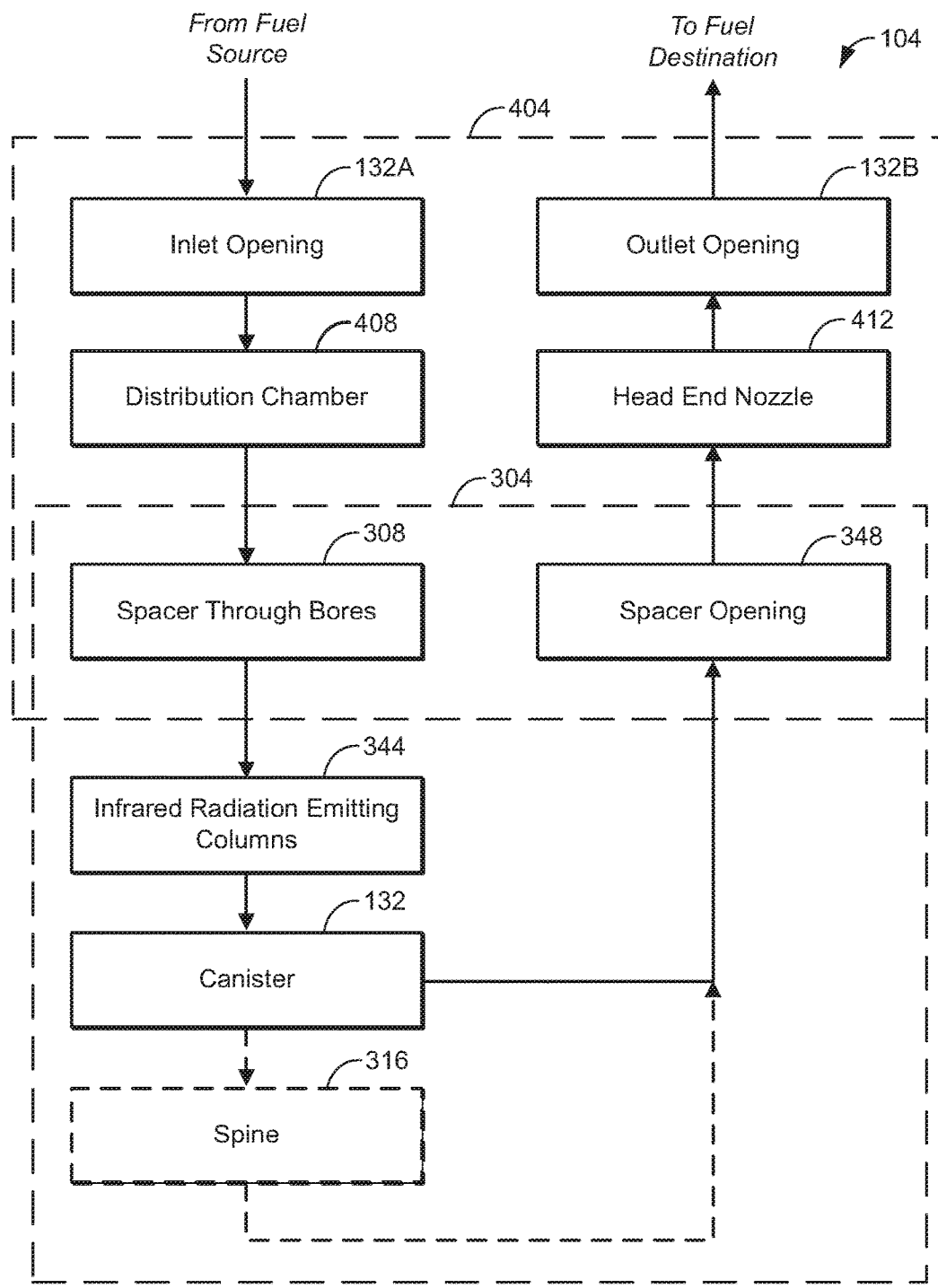
FIG. 11 is a block diagram illustrating fuel flow through an exemplary fuel treatment module.

The spine 316 typically provides a conduit through which fuel can exit the canister 124 on its route to an engine, such as an internal combustion engine. In such case, the spine 316 may extend from the opening perimeter 212 in the spacer 120, such as shown in FIG. 6. In this manner, fuel that is exiting the canister 124 enters a distal end of the spine 316 to flow through the interior of the spine and through the opening 348 of the spacer 120 and through conduit 416 where it may subsequently exit the fuel treatment module 104 at the fuel outlet 132B (FIGS. 6, 11). Optionally, the distal end of the spine 316 may be closed and holes may be present in the spine 316 to allow fuel to enter; these might be particularly disposed at the proximal end (i.e. the head end) of the spine 315, thus facilitating fluid flow. If a spine 316 is not used, a loop of hose or multiple loops of hose may be disposed in the middle of the IR/shunt columns 350 with the IR/shunt columns 350 then tied to, and supported by, this one or more interior spacing hoses.

Referring now to the side cross-sectional views of FIG. 6, the spacer 120 and its through bores 308 in combination with a head cap 116 form a manifold assembly 404. The manifold assembly 404 serves to slow the fuel flow rate by at least half compared to the fuel flow rate at the fuel inlet 132A. Therefore, the collective cross-section of the through bores 308 is greater than twice the cross-section of the fuel inlet 132A. The head cap 116, spacer 120 or both may have recessed portions to form a fuel distribution chamber 408 when the head cap and spacer are secured to one another. As shown in FIG. 6 for example, both the head cap 116 and spacer 120 have a recessed portion to form, when combined, a fuel distribution chamber 408. In operation, fuel received at an inlet opening 132A of the head cap 116 first enters the fuel distribution chamber 408 for subsequent distribution to each IR/shunt column's shunt tube 312 via the through bores 308 of the spacer 120.

As also seen in FIG. 6, the fluid-tight conduit 416 of the head cap 116 and spacer 120 extends from the spacer opening perimeter 212 defining a portion of the opening 348 of the spacer 120 through the head opening perimeter 412 of the head cap to the fuel outlet 132B of the head cap. Fuel that is exiting the fuel treatment module 104 does so by flowing through the entrance to the opening 348 that is in fluid communication, such as via one or more other conduits 416, with one or more fuel outlets 132B of the head cap, and then flows out through one or more fuel outlet connectors 130 (FIG. 1B). (Commonly only one conduit 416 and one fuel outlet 132B, as illustrated, may be used.) The fuel outlet connector 130 connects the fuel treatment module 104 to the fuel lines of the engine system into which the fuel treatment module 104 is integrated.

As can be seen in FIG. 6, it is noted that the one or more hose barbs 342 may be secured to or protrude into the spacer 120 with one or more fasteners (not shown). Each of the hose barbs 342 provide an attachment point for a shunt tube 312.

Figure 8B:
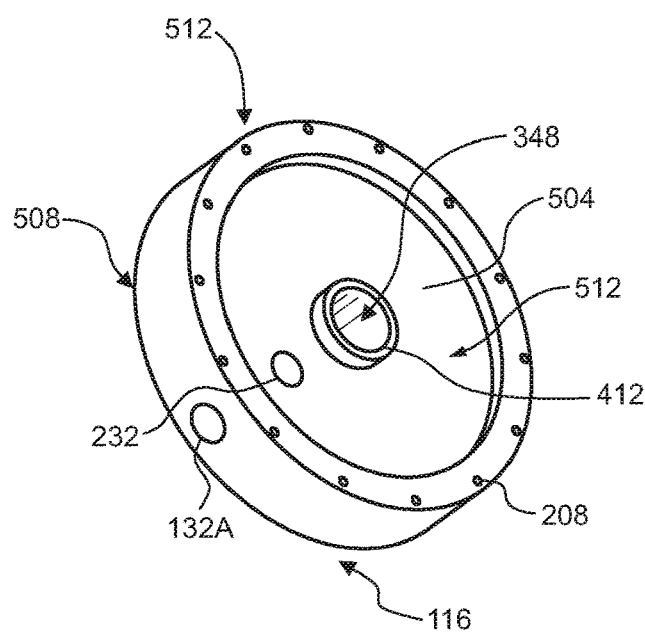
FIG. 8B is a perspective view of the bottom of the first exemplary head cap of FIG. 8A.
Figure 8A:
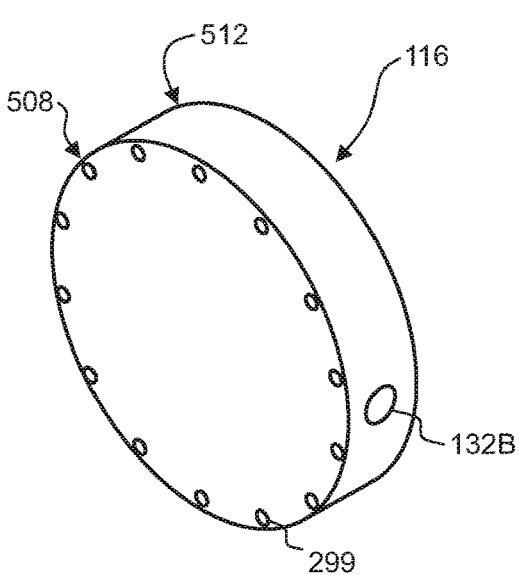
FIG. 8A is a perspective view of the top of a first exemplary head cap.

The head cap 116 may vary, while retaining the functions of providing a fuel inlet, fuel distribution system and fuel outlet. Two exemplary head caps 116 will now be described with regard to FIGS. 8A-8B and 9A-9B. FIGS. 8A-8B illustrate, respectively, a top and bottom perspective view of a first head cap 116, while FIGS. 9A-9B illustrate, respectively, a top and bottom perspective view of a second head cap 116. As can be seen, the inlet openings 132A and fuel outlets 132B are positioned differently between the two head caps 116. Namely, the inlet and fuel outlets 132A, 132B are at the opposing sides of the first head cap 116 of FIGS. 8A-8B, and at the top 508 of the second head cap of FIGS. 9A-9B. It is contemplated that the second head cap may be selected because its topside inlet and fuel outlets 132A, 132B require less lateral space. The placement of the inlet and fuel outlets 132A, 132B (including having both the fuel inlet and fuel outlet on the side of the head cap 116, having both the fuel inlet and fuel outlet on the top side of the head cap 116, and having one fuel inlet or outlet on the side of the head cap 116 and having one fuel inlet or outlet on the top side of the head cap 116) may be advantageously positioned to fit the limitations of particular types of trucks or other environments having specific size, shape, and orientation limitations. An inlet opening 132A may extend from an exterior surface of a head cap 116 to an in-flow conduit 232 that allows fuel to exit at its bottom end 512 of the head cap 116 to permit fuel to flow into the fuel distribution chamber from an externally attached fuel line or conduit. The diameter of the opening of the inlet 132A is at least equal in diameter to the diameter of the head cap in-flow conduit 232.

As described above, a head cap 116 may have a recessed portion 504 (FIG. 8B) at its bottom end 512, which may be used to form a fuel distribution chamber 408. Or, as seen in FIG. 9B, the bottom end 512 of the head cap 116 may not be recessed, in which case the fuel distribution chamber 408 is formed fully within the spacer.

One or more corresponding boreholes 208 may be formed along the periphery (or elsewhere) of a head cap 116 (FIGS. 8B, 9B), spacer 120 (FIG. 3), and/or canister 124 (FIGS. 1B, 2A, 2B) to allow these elements to be secured together, such as via one or more threaded, unthreaded or other fasteners that pass through or into such boreholes. Various other boreholes may be disposed in other locations (shown at the top of the head cap 116) to facilitate fabrication and joining of the various parts of the fuel treatment module 104.

Various infrared radiation emitting elements 320 will now be described with regard to the various perspective views of FIG. 10. As can be seen, an infrared radiation emitting element 320 may comprise a disk having an annular surface defining opening 604 that is configured to accept a shunt tube 312 of the fuel treatment module 104. An opening 604 may substantially conform to the peripheral shape and size of a shunt tube 312 to maximize the surface area in contact with the shunt tube. Alternatively, an opening 604 may simply circumscribe a shunt tube.

In addition, each infrared radiation emitting element 320 may have a top surface 608 and bottom surface 612 that correspond to one another such that a plurality of infrared radiation emitting elements may be stacked or channeled with little or no space between them if desired. For instance, the infrared radiation emitting elements 320 of FIGS. 10A, 10B-10F each have a flat planar surface. It is contemplated that, in some embodiments, mating structures such as tabs/protrusions 640 and slots/recesses 650, such as illustrated in FIG. 10B, may be formed in infrared radiation emitting elements 320 to allow these elements to connect to one another when stacked in a column.

Figure 10B:
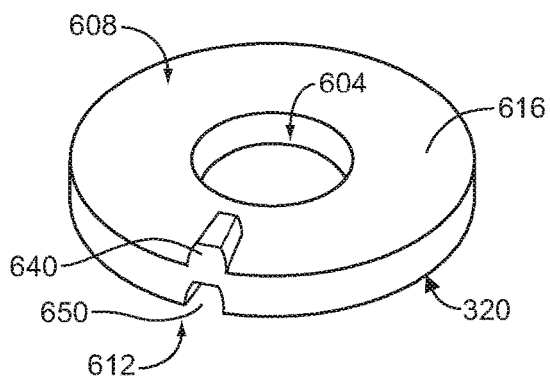
Figure 10E:
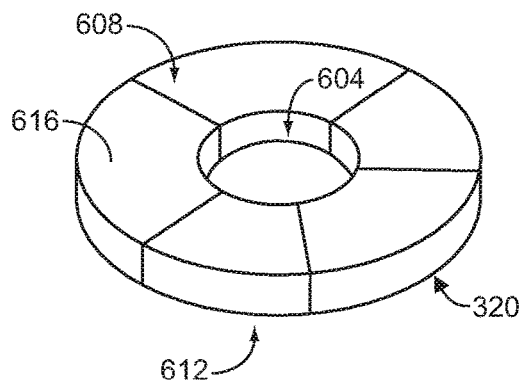
Figure 10C:
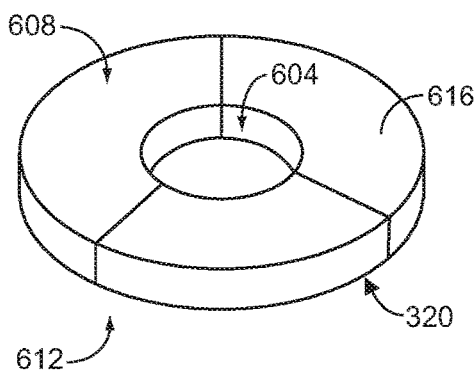
Figure 10F:
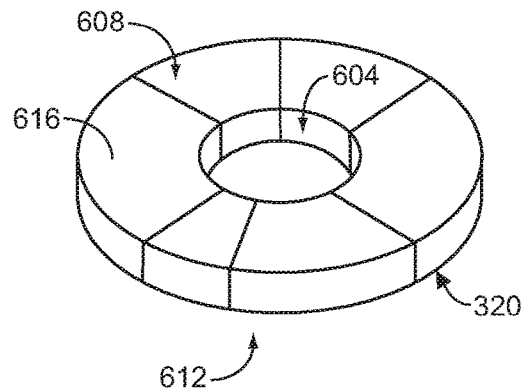
Figure 10D:
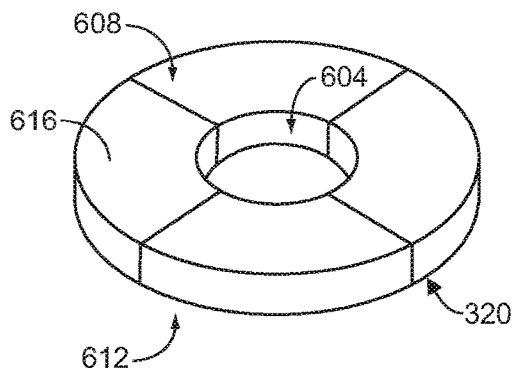

The infrared radiation emitting elements 320 may have a smooth annular surface (FIGS. 10B-10F) or may have an annular surface, or a portion thereof, that is pitted, grooved, dimpled, channeled, fluted, furrowed, or the like as seen in FIG. 10A. The irregular, textured surface 664 may provide advantages in increasing the surface area of the infrared radiation emitting elements 320, thereby increasing the infrared radiation toward the interior IR-overlaid channels 344 to potentially increase fuel exposure to infrared radiation.

Additionally, the infrared radiation emitting elements 320 may have a smooth circumferential surface (FIGS. 10B-10F) or may have a circumferential surface that is pitted, grooved, dimpled, channeled, fluted, furrowed, or the like. A grove 622 (FIG. 10A) may provide advantages in securely attaching the infrared radiation emitting elements 320 to the exterior of the shunt tubes 312. Pitting may provide an advantage in by increasing the surface area at the circumference of the infrared radiation emitting elements 320, thereby increasing the infrared radiation toward the exterior of the infrared radiation emitting elements 320.

An infrared radiation emitting element 320 may also be formed from one segment 616 (FIG. 10B) or multiple segments 616 (FIGS. 10A, 10B-10F) of the same or different materials. For instance, two of the segments 616 of FIG. 10C may be formed of far infrared-emitting material, and one of the segments 616 may be formed of medium infrared-emitting material. The infrared radiation emitting elements 320 of FIGS. 10A-F show configurations having varying numbers of segments 616. The number of segments 616 may be defined based on the desire or need for segments of one or more materials, such as different ceramics. Alternatively, or in addition, the number of segments 616 may be defined by the diameter of a shunt tube to be received by an infrared radiation emitting element 320, with more segments being added to increase the diameter of an infrared radiation emitting element's opening 604. It is noted that the segments 616 of an infrared radiation emitting element 320 need not fit perfectly together and, as such, there may be spaces or gaps therebetween. As shown in FIGS. 10A-F, the segments 616 in an infrared radiation emitting element 320 may be non-uniform in size, shape or both. This is beneficial in that a variety of segments 616 may be mixed and matched so as to conform to or circumscribe different shunt tubes.

The infrared radiation emitting elements 320 are preferably formed of transition metal oxide complexes that have multiple oxidation states. The constituent electrons of these complexes can be thermally agitated to reach the neighboring higher energy levels. The excited electrons then return to their initial states by emitting infrared photons in the 3 to 20 µm wavelength range. The spectral profile of the IR luminance depends on the oxidation states of the complexes. This transition metal oxide material is heated in a kiln at between 1150-1450 degrees, and preferably approximately 1300 degrees, to form the ceramic segments 616.

The ceramics composition of the infrared radiation emitting elements 320 is designed to absorb heat from the ambient surroundings and emit the infrared photons in the designated wavelength range indefinitely at any temperature above absolute zero. Therefore, no heating is required to activate the infrared radiation emitting elements 320. However, because the infrared emission activity increases with increased ambient temperature, in some environments of use, an external heater may help amplify IR emissions.

In the fuel treatment module 104, the fuel is brought close to the ceramic infrared radiation emitting elements 320. When photons are emitted from the elements 320 the molecules in the fuel that have a molecular state that matches the wavelength (or frequency) of the photon can absorb the photon. The photon then ceases to exist, and its energy is transferred (via vibrational, rotational, electronic, or translational form) to the molecule of fuel. For example, molecular vibration may excite the fuel molecule for a very short period, from nanoseconds to microseconds. When this molecular vibration stops, the photon may be released to be absorbed by other fuel molecules having a molecular state that matches the wavelength of the photon. Consequently, the majority of photons emitted from the infrared radiation emitting elements 320 may exist in the fuel (being passed around from molecule to molecule) for up to a few minutes before they vanish.

In an exemplary construction, a ten-inch spacer is placed in a vise and twenty-one ¾-inch thread to ½-inch thread hose barbs are tightened within the through bores 308 to attach them to the spacer. As seen in FIG. 5, the inner shunt tubes of approximately 24 inches in length are attached to the hose barbs first. Then multiple ceramic segments 616 are arranged around the exterior of the shunt tube to form a disk-like shape and are secured with a segment binding 620 or other fastener extending around its periphery. For example, a zip tie or other tie may be used as a segment binding 620. Preferably, the segment binding 620 will be substantially transparent to infrared radiation. When all of the infrared radiation emitting elements 320 are attached around the first shunt tube, the shrink-wrap type tubular wrapping 328 is positioned around this first IR/shunt column 350 and heated to shrink and tighten the wrapping 328 to hold the infrared radiation emitting elements 320 in place. This forms the first IR/shunt column 350.

Additional infrared radiation emitting elements 320 are attached around the remaining shunt tubes and tubular wrapping 328 is installed to form the remaining IR/shunt columns 350. The completed internal fuel treatment assembly 304 is then inserted into the canister 124 with the canister 124 and head cap 116 attached to the spacer via the flange and head cap boreholes 208. Two fuel inlet/outlet connectors 130 (FIG. 1B) are attached via threads 666 to the inlet opening 132A and to the outlet opening 132B. At the location of use, fuel lines of the engine system are then attached to both of the fuel inlet/outlet connectors 130.

The fuel treatment capacity of a fuel treatment module may be adjusted based on the amount of fuel and rate at which fuel must be treated. For instance, the fuel treatment module may have fewer infrared radiation emitting elements 320 to provide a lower capacity, and an increased number of infrared radiation emitting elements to provide higher capacity. The total number of infrared radiation emitting element 320 for a particular fuel treatment module may be determined based on the rate of fuel flow required or desired, such as for an internal combustion engine or other fuel destination. Alternatively, or in addition, the total number of infrared radiation emitting elements 320 may be determined based on the type or particular characteristics of the fuel to be treated. For instance, bunker fuel (#6 diesel) or other low-grade fuel may require additional treatment and additional infrared radiation emitting elements 320 versus gasoline.

In determining the number of infrared radiation emitting elements 320, the fuel flow rate is the most important factor, with the anticipated temperature of the fuel being a secondary factor. Other variables that may be considered in the design of the internal fuel treatment assembly 304 and in the number infrared radiation emitting elements 320 are the ambient temperature, the barometric pressure, the fuel type to be treated, the duty cycle, any fuel additives, and operator habits. For example, one IR/shunt column 350 of approximately 24 inches as illustrated in FIGS. 3-4 is installed per five gallons for gross fuel flow per hour when treating gasoline and when treating #1 and #2 diesel fuel. But #6 diesel fuel, in contrast, requires about two and a half of the IR/shunt columns 350 per five gallons of gross fuel flow per hour. Installations with less than five gallons of fuel flow per hour need only one-third of the IR/shunt column 350 of FIGS. 3-4. The use of this number of infrared radiation emitting elements 320 is utilized to achieve saturation in the fuel system.

The optimum fuel temperature for IR photon production is between 100 and 120 degrees F., which is within the operating temperature range for engine platforms using #1 or #2 diesel or gasoline. If the anticipated temperature will be above or below this optimum range, additional IR/shunt columns 350 with sets of infrared radiation emitting elements 320 should be used to achieve sufficient saturation. For example, for every 5 degrees F. above or below the optimum fuel range, an additional two-tenths of a IR/shunt column 350 should be used.

However, when using #6 diesel, the fuel must be heated to approximately 200 degrees F. to reach a viscosity that will allow pumping of the fuel into the injection rack. And, when using #6 diesel, one additional IR/shunt column 350 will be needed for every 10 degrees of temperature above the 120-degree top of the optimum fuel temperature range. Since 200 degrees is 80 degrees higher than the 120 degrees F. of the top of the optimum fuel temperature range, then an additional eight IR/shunt columns 350 will be needed to achieve sufficient saturation.

The infrared radiation emitting elements 320 may be installed in various ways. For instance, the total number of infrared radiation emitting elements 320 may be evenly distributed and installed in one or more IR/shunt column 350. The number and length of each IR/shunt column 350 may be determined based on various requirements. For instance, space constraints may require a taller, thinner fuel treatment module versus a wider shorter fuel treatment module. In such case, fewer but longer channels would be provided. Other elements of a fuel treatment module, such as its canister 124, spacer 120, head cap 116, and internal fuel treatment assembly 304 may be sized accordingly to accommodate the selected configuration and quantity of channels.

Fuel flow at an exemplary fuel treatment module 104 will now be described with regard to the block diagram of FIG. 11. As can be seen, fuel may flow from a fuel source, such as a fuel tank, pipe or the like, into an inlet opening 132A and then into a distribution chamber 408 of the fuel treatment module's manifold assembly 404. (The distribution chamber 408 in this exemplary module is shown as being partially created within the head cap 116 and partially created within the spacer 120.) The fuel then flows through through bores 308 of a spacer 120 and into each of a plurality of IR/shunt columns 350 (bearing a plurality of infrared radiation emitting elements as described above). The fuel exits the IR/shunt columns 350 and flows into the open areas 122 of the canister 124. As described above, the fuel is exposed to infrared radiation from the infrared radiation emitting elements both while flowing through the IR-overlaid channel 344 within each IR/shunt column 350 and, additionally, while flowing through the open areas 122 of the canister 124.

The fuel exits the canister 124 through an opening 348 defined by spacer opening perimeter 212 of the spacer 120. However, fuel may optionally (as illustrated by the dashed lines of FIG. 11) first flow through a spine 316 of the fuel treatment module's internal fuel treatment assembly 304 before arriving at, and flowing through, the flow path opening 348 defined by the spacer opening perimeter 212. After passing the spacer perimeter 212, the fuel flows through the flow path inside opening 348 of the head cap 116 (which is defined by the head perimeter 412 of conduit 416) and flows out the fuel outlet 132B to its destination. The destination may be an internal combustion engine or other device that consumes/combusts the fuel. Alternatively, it is contemplated that the destination may be another fuel treatment module 104 (for further treatment) or a fuel tank or other storage device.

Figure 12A:
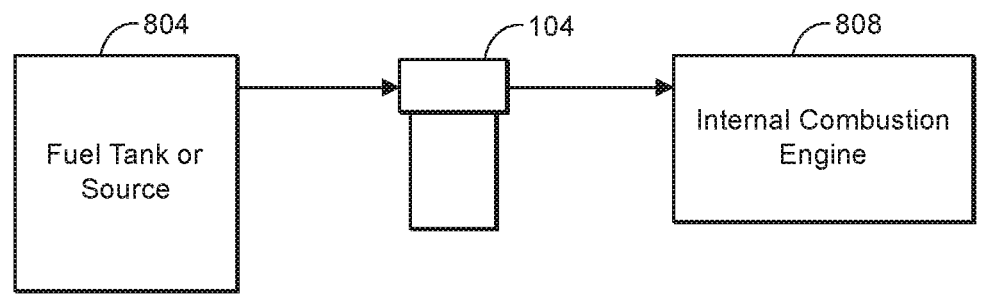
FIG. 12A is a block diagram illustrating an exemplary environment of use for a fuel treatment module.
Figure 12B:
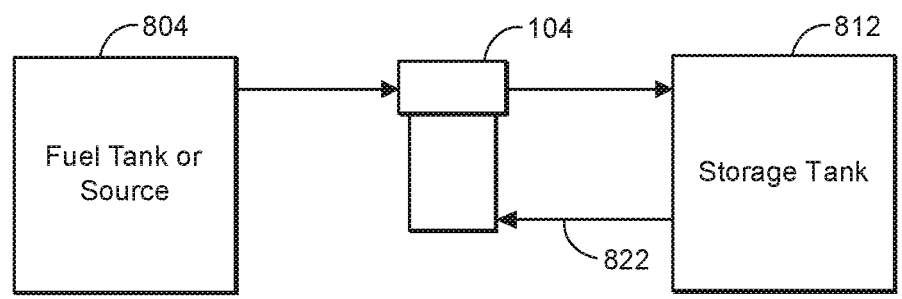
FIG. 12B is a block diagram illustrating an exemplary environment of use for a fuel treatment module.

FIGS. 12A-12D are block diagrams illustrating exemplary fuel treatment modules 104 in various environments of use. As can be seen from FIGS. 12A-12B, a fuel treatment module 104 may receive fuel from a fuel tank 804, pipe or other fuel source. After treatment, treated fuel from a fuel treatment module 104 may be used in an internal combustion engine 808 (FIG. 12A) or stored in a storage or day tank 812 (FIG. 12B), which may be used as a pretreatment holding tank from which the fuel is recycled 822 back into the fuel treatment module 104 for maximum saturation and from which the fuel is held for later use. Any return fuel that is returned from an internal combustion engine 808 is preferably collected in a storage/day tank 812, such as seen in FIG. 12B, and recycled 822 back through the fuel treatment module 104 for retreatment and reuse.

Figure 12C:
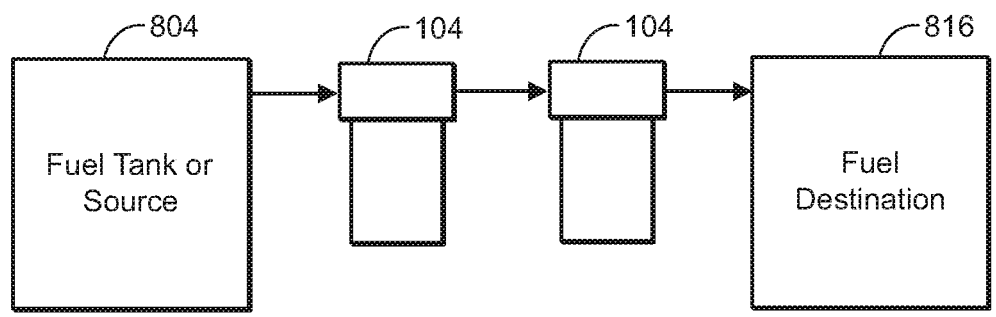
FIG. 12C is a block diagram illustrating an exemplary environment of use for a plurality of fuel treatment modules connected in series.

FIG. 12C illustrates an environment of use showing an optional in-series configuration of the multiple fuel treatment modules 104, which are connected to one another in series to treat fuel from a fuel tank 804. In this environment, the fuel flows through a plurality of fuel treatment modules 104 to its fuel destination 816, which may be an internal combustion engine, storage tank or other device. Though shown with two fuel treatment modules 104, it is noted that additional fuel treatment modules may be connected to one another.

Figure 12D:
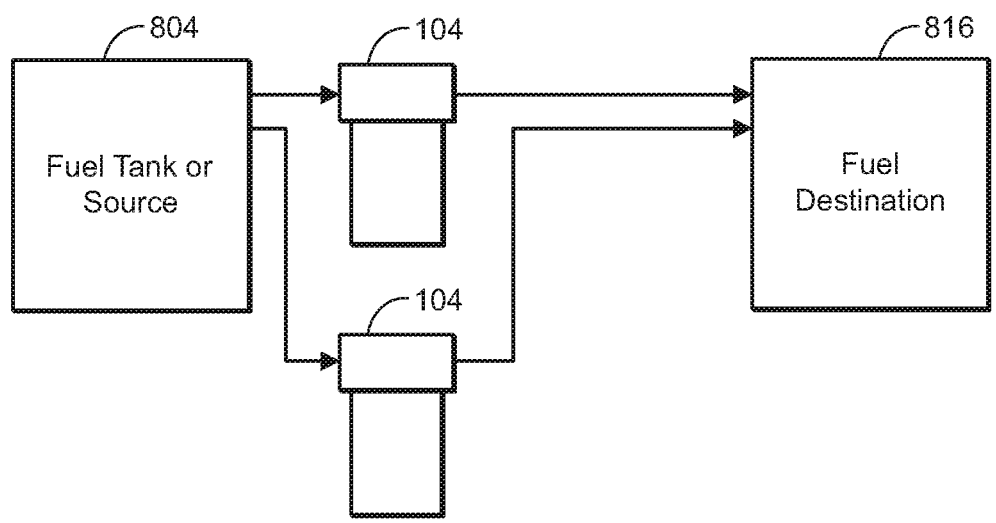
FIG. 12D is a block diagram illustrating an exemplary environment of use for a plurality of fuel treatment modules connected in parallel.

FIG. 12D illustrates an environment of use showing multiple fuel treatment modules 104 connected in the preferred in-parallel configuration. As can be seen, each fuel treatment module 104 may have a connection to a fuel tank 804 and fuel destination 816 to increase the rate at which a volume of fuel is treated. This is desirable when treating a large volume of fuel. In general, increasing the number of fuel treatment modules 104 connected in parallel (i.e., increasing exposure to infrared radiation), permits a higher fuel flow rate from the fuel's source 804 (such as a fuel tank) to its destination 816, while ensuring the fuel is treated. For example, utilizing two fuel treatment modules 104, as shown in parallel in FIG. 12D, increases the total fuel flow rate by approximately a factor of two without affecting engine performance.

It is contemplated that a combination of series and parallel connections may be used as well. For example, individual groups of multiple fuel treatment modules 104 that are connected in series within their group, may be connected in parallel to a fuel tank 804 as well. Additionally, in any of the combinations and configurations, any return fuel that is returned from the fuel destination 816 may be directed 822 back to the fuel treatment module 104 for retreatment and use or may, alternatively, be collected in a storage/day tank 812, such as seen in FIG. 12B, and recycled 822 back through the fuel treatment module 104.

In the previous description, numerous specific details were set forth in order to provide a more thorough description of the present invention. It will be apparent, however, to one skilled in the art, that the present invention may be practiced without these specific details. In other instances, well-known features have not been described in detail so as not to obscure the invention. While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A fuel treatment module comprising:
   a head cap comprising a fuel inlet defined by a fuel inlet opening to receive fuel, a fuel outlet defined by a fuel outlet opening to allow fuel to exit the fuel treatment module, and a head cap opening perimeter;
   a spacer comprising a plurality of through bores and a spacer opening perimeter;
   a distribution chamber formed between the head cap and the spacer;
   a plurality of IR/shunt columns, each comprising a shunt tube and a plurality of infrared radiation emitting elements, wherein the shunt tube of each of the plurality of IR/shunt columns is attached to the spacer at one of the plurality of through bores;
   a canister having a body and an end cap configured to enclose the plurality of IR/shunt columns and to enclose fuel flowing out of each shunt tube such that the fuel fills the open areas of the canister and flows out of the canister into the spacer; and
   a fluid-tight conduit extending between the spacer opening perimeter and the head cap opening perimeter to the fuel outlet, wherein the fuel flowing out of the canister flows through the fluid-tight conduit to exit the fuel treatment module at the fuel outlet.

2. The fuel treatment module as recited in claim 1, further comprising a spline having a proximal end attached to the spacer opening perimeter, wherein the fuel flows from the canister, through the spline, and through the fluid-tight conduit to exit the fuel treatment module at the fuel outlet.

3. The fuel treatment module as recited in claim 2, wherein the spline has an open distal end.

4. The fuel treatment module as recited in claim 2, further comprising column bindings, wherein the plurality of IR/shunt columns are attached to the spline by the column bindings.

5. The fuel treatment module as recited in claim 1, wherein the plurality of infrared radiation emitting elements comprise one or more ceramic sections.

6. The fuel treatment module as recited in claim 5, wherein multiple ones of the ceramic sections are configured to be arranged around the shunt tube to form a disk-like shape.

7. The fuel treatment module as recited in claim 5, wherein the one or more ceramic sections comprise multiple ceramic sections, and wherein at least one of the multiple ceramic sections is formed of a far infrared-emitting material and at least one of the multiple ceramic sections is formed of a medium infrared-emitting material.

8. The fuel treatment module as recited in claim 1, wherein each of the plurality of infrared radiation emitting elements has a circumferential surface and an annular surface that defines an opening that accommodates the shunt tube.

9. The fuel treatment module as recited in claim 8, wherein at least one of the annular surface or the circumferential surface is a textured surface.

10. The fuel treatment module as recited in claim 1 further comprising shrink-wrap type tubular wrapping disposed around at least one of the plurality of IR/shunt columns.

11. The fuel treatment module as recited in claim 1, wherein each of the plurality of infrared radiation emitting elements comprises transition metal oxide complexes.

12. The fuel treatment module as recited in claim 11, wherein each of the plurality of infrared radiation emitting elements is heated in a kiln at 1150-1450 degrees.

13. The fuel treatment module as recited in claim 1, wherein at least one of the plurality of infrared radiation emitting elements is formed of a far infrared-emitting material and at least one of the plurality of infrared radiation emitting elements is formed of a medium infrared-emitting material.

14. The fuel treatment module as recited in claim 1, wherein the collective cross-sections of the plurality of through bores is greater than twice the cross-section of the fuel inlet.

15. A fuel treatment module comprising:
a head cap comprising a fuel inlet defined by a fuel inlet opening to receive fuel, a fuel outlet opening to allow fuel to exit the fuel treatment module, and a head cap opening perimeter;
a spacer comprising a plurality of through bores and a spacer opening perimeter;
a distribution chamber formed between the head cap and spacer;
a plurality of IR/shunt columns, each comprising a shunt tube and a plurality of infrared radiation emitting elements; wherein the shunt tube of each of the plurality of IR/shunt columns is attached to the spacer at one of the plurality of through bores; wherein the infrared radiation emitting elements comprise multiple ceramic sections; wherein multiple ones of the ceramic sections are configured to be arranged around the shunt tube to form a disk-like shape; and wherein multiple ones of the ceramic sections are formed of a far infrared-emitting material and multiple ones of the ceramic sections are formed of a medium infrared-emitting material;
a canister having a body and an end cap configured to enclose the plurality of IR/shunt columns and to enclose fuel flowing out of each shunt tube such that the fuel fills the open areas of the canister and flows out of the canister through an opening in the spacer;
a spline having an open distal end and a proximal end attached to the spacer opening perimeter, wherein the fuel flows from the canister, through the spline, and through the fluid-tight conduit to exit the fuel treatment module at the fuel outlet;
column bindings, wherein the plurality of IR/shunt columns are attached to the spline by the column bindings; and
a fluid-tight conduit extending between the spacer opening perimeter and the head cap opening perimeter to the fuel outlet, wherein the fuel flowing out of the canister flows through the fluid-tight conduit to exit the fuel treatment module at the fuel outlet.

16. The fuel treatment module as recited in claim 15, wherein each of the plurality of infrared radiation emitting elements comprises transition metal oxide complexes.

17. The fuel treatment module as recited in claim 15, wherein each of the plurality of infrared radiation emitting elements is heated in a kiln at 1150-1450 degrees.

18. The fuel treatment module as recited in claim 15, wherein the collective cross-section of the plurality of through bores is greater than twice the cross-section of the fuel inlet.

* * * * *